United States Patent
Jin et al.

(10) Patent No.: US 11,688,885 B2
(45) Date of Patent: *Jun. 27, 2023

(54) SECONDARY BATTERY

(71) Applicant: NINGDE AMPEREX TECHNOLOGY LIMITED, Ningde (CN)

(72) Inventors: Xin Jin, Ningde (CN); Tao Tao, Ningde (CN); Jie Xi, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 294 days.

This patent is subject to a terminal disclaimer.

(21) Appl. No.: 17/100,639

(22) Filed: Nov. 20, 2020

(65) Prior Publication Data

US 2021/0075066 A1 Mar. 11, 2021

Related U.S. Application Data

(63) Continuation of application No. 15/994,190, filed on May 31, 2018, now Pat. No. 10,886,570, which is a continuation of application No. PCT/CN2016/070298, filed on Jan. 6, 2016.

(51) Int. Cl.
*H01M 50/538* (2021.01)
*H01M 50/557* (2021.01)
(Continued)

(52) U.S. Cl.
CPC ....... *H01M 10/0587* (2013.01); *H01M 10/36* (2013.01); *H01M 50/124* (2021.01);
(Continued)

(58) Field of Classification Search
CPC ............. H01M 50/538; H01M 50/116; H01M 50/543; H01M 50/183; H01M 50/172
See application file for complete search history.

(56) References Cited

U.S. PATENT DOCUMENTS

2005/0014036 A1 1/2005 Kim
2009/0297946 A1* 12/2009 Yue ................. H01M 10/058
29/623.5
(Continued)

FOREIGN PATENT DOCUMENTS

CN 201466126 U * 5/2010
CN 102610779 A 7/2012
(Continued)

OTHER PUBLICATIONS

Machine Translation of: CN 103490031 A, Fan, Jan. 1, 2014.*
(Continued)

*Primary Examiner* — Kenneth J Douyette
(74) *Attorney, Agent, or Firm* — Morgan, Lewis & Bockius LLP

(57) ABSTRACT

A secondary battery, including an electrode assembly and a housing accommodating the electrode assembly. The electrode assembly includes a first electrode plate, a second electrode plate, and a separator disposed there between. The first electrode plate and the second electrode plate are wound to form the electrode assembly. A tab is disposed in the first electrode plate and protrudes from the housing; and an adhesive layer is disposed in the tab. The adhesive layer includes a first portion sandwiched between a package area of the housing and a second portion extending from the first portion along a length direction of the tab. In a width direction of the tab, the first portion has a width greater than that of the second portion. In the length direction of the tab, the second portion protrudes into a space enclosed by an innermost layer of the separator.

16 Claims, 5 Drawing Sheets

(51) Int. Cl.
*H01M 50/547* (2021.01)
*H01M 50/198* (2021.01)
*H01M 50/55* (2021.01)
*H01M 10/0587* (2010.01)
*H01M 10/36* (2010.01)
*H01M 50/124* (2021.01)
*H01M 50/178* (2021.01)
*H01M 50/186* (2021.01)
*H01M 10/0525* (2010.01)
*H01M 10/054* (2010.01)

(52) U.S. Cl.
CPC ....... *H01M 50/178* (2021.01); *H01M 50/186* (2021.01); *H01M 50/198* (2021.01); *H01M 50/538* (2021.01); *H01M 50/547* (2021.01); *H01M 50/55* (2021.01); *H01M 50/557* (2021.01); *H01M 10/054* (2013.01); *H01M 10/0525* (2013.01)

(56) References Cited

U.S. PATENT DOCUMENTS

| | | |
|---|---|---|
| 2010/0233536 A1 | 9/2010 | Yang et al. |
| 2014/0011060 A1 | 1/2014 | Yang et al. |
| 2014/0030560 A1 | 1/2014 | Lev et al. |
| 2016/0149268 A1 | 5/2016 | Fan et al. |

FOREIGN PATENT DOCUMENTS

| | | | |
|---|---|---|---|
| CN | 202454645 U | | 9/2012 |
| CN | 103490031 A | * | 1/2014 |
| CN | 203406363 U | | 1/2014 |
| CN | 203800133 U | | 8/2014 |
| EP | 1562241 A2 | | 8/2005 |

OTHER PUBLICATIONS

Machine Translation of: CN 201466126 U, Zheng, May 12, 2010.*
Jin, Office Action, U.S. Appl. No. 15/994,190, dated Oct. 22, 2019, 14 pgs.
Jin, Final Office Action, U.S. Appl. No. 15/994,190, dated May 1, 2020, 17 pgs.
Jin, Notice of Allowance, U.S. Appl. No. 15/994,190, dated Aug. 12, 2020, 9 pgs.
Ningde Amperex Technology Limited, International Search Report Written Opinion PCT/CN2016/070298, dated Apr. 27, 2016, 13 pgs.
Office Action, CN201680069506-5, dated Aug. 4, 2020, 6 pgs.
Office Acion, CN201680069506-5, dated Apr. 13, 2021, 6 pgs.

* cited by examiner

Fig.I

SECONDARY BATTERY

CROSS REFERENCE TO RELATED APPLICATIONS

This application is a continuation application of U.S. patent application Ser. No. 15/994,190, filed May 31, 2018, now U.S. Pat. No. 10,866,570, and entitled "SECONDARY BATTERY", which is a continuation application of PCT Patent Application No. PCT/CN2016/070298, entitled "RECHARGEABLE BATTERY" filed on Jan. 6, 2016, all of which are incorporated herein by reference in their entirety.

TECHNICAL FIELD

The present invention relates to the field of batteries, in particular to a secondary battery.

BACKGROUND

With reference to FIG. 1, the sealing strip 3 of the secondary battery in the prior art is in a conventional rectangular shape to ensure that the sealing strip can be effectively sealed by the top of the battery pouch 2.

However, if the sealing strip 3 is too close to the separator 11, then the sealing strip and the inner ring of the separator have a great probability to interfere with each other (for example, the interference area S in FIG. 1), which influences the winding of the separator 11 and reduces winding efficiency.

In the prior art, the interference with the separator 11 can be further reduced by reducing the shoulder width of the sealing strip 3, however, the shoulder width of the sealing strip 3 could not be reduced infinitely. The shoulder width 1.0 mm at present is already the limit, and the further less shoulder width will cause the risk of package leakage.

SUMMARY

To solve the problem in the prior art, the object of the present invention is to provide a secondary battery which can safely seal the battery pouch and the winding bare electrode assembly while avoiding the separator and the sealing strip from interfering with each other when the winding bare electrode assembly is wound and formed, thus improving winding efficiency and winding quality.

To achieve the above object, the present invention provides a secondary battery, comprising a winding bare electrode assembly, a battery pouch and a sealing strip.

The winding bare electrode assembly comprises a separator and a tab.

The sealing strip encloses a part of the tab of the winding bare electrode assembly, is used for hermetically extending the tab of the winding bare electrode assembly out from the battery pouch of the secondary battery, and is provided with a package portion located in a package area of the battery pouch of the secondary battery, and an extension portion disposed in the battery pouch.

Wherein a first width of the package portion in the width direction is greater than a second width of the tab, a third width of the extension portion in the width direction is not less than the second width of the tab, and is less than the first width of the package portion, the outer side edge of the extension portion in the width direction is separated from the separator in the width direction, and the lower side edge of the package portion in the length direction is separated from the upper side edge of the separator in the length direction.

The beneficial effects of the present invention are as follows:

In the secondary battery according to the present invention, the first width of the package portion in the width direction is greater than the second width of the tab, the package portion is located in the package area of the battery pouch of the secondary battery, such that the tab of the winding bare electrode assembly hermetically extends out from the battery pouch of the secondary battery, after being packaged, the secondary battery can be avoided from leaking liquid from the position from which the tab extends out of the battery pouch; the extension portion encloses the part inside the battery pouch of the tab of the winding bare electrode assembly, thus preventing the battery from internal short circuit and erosion because the tab is excessively bared; furthermore, the third width of the extension portion in the width direction is not less than the second width of the tab, and is less than the first width of the package portion, the outer side edge of the extension portion in the width direction is ensured to separate from the separator in the width direction, in which way the separator and the outer side edge of the extension portion in the width direction can be prevented from interfering with each other when the winding bare electrode assembly is wound and formed, thus improving the winding efficiency and the winding quality; owing to the reduction of the third width of the extension portion, the width of the secondary battery and the limit separation size of the tab can be improved, thus increasing the diversity of product sizes; the lower side edge of the package portion in the length direction is separated from the upper side edge of the separator in the length direction, such that the interference between the separator and the package portion as well as the battery pouch when the secondary battery is packaged can be avoided, thus improving the sealing effect of the tab package.

DETAILED DESCRIPTION

Figure 1:
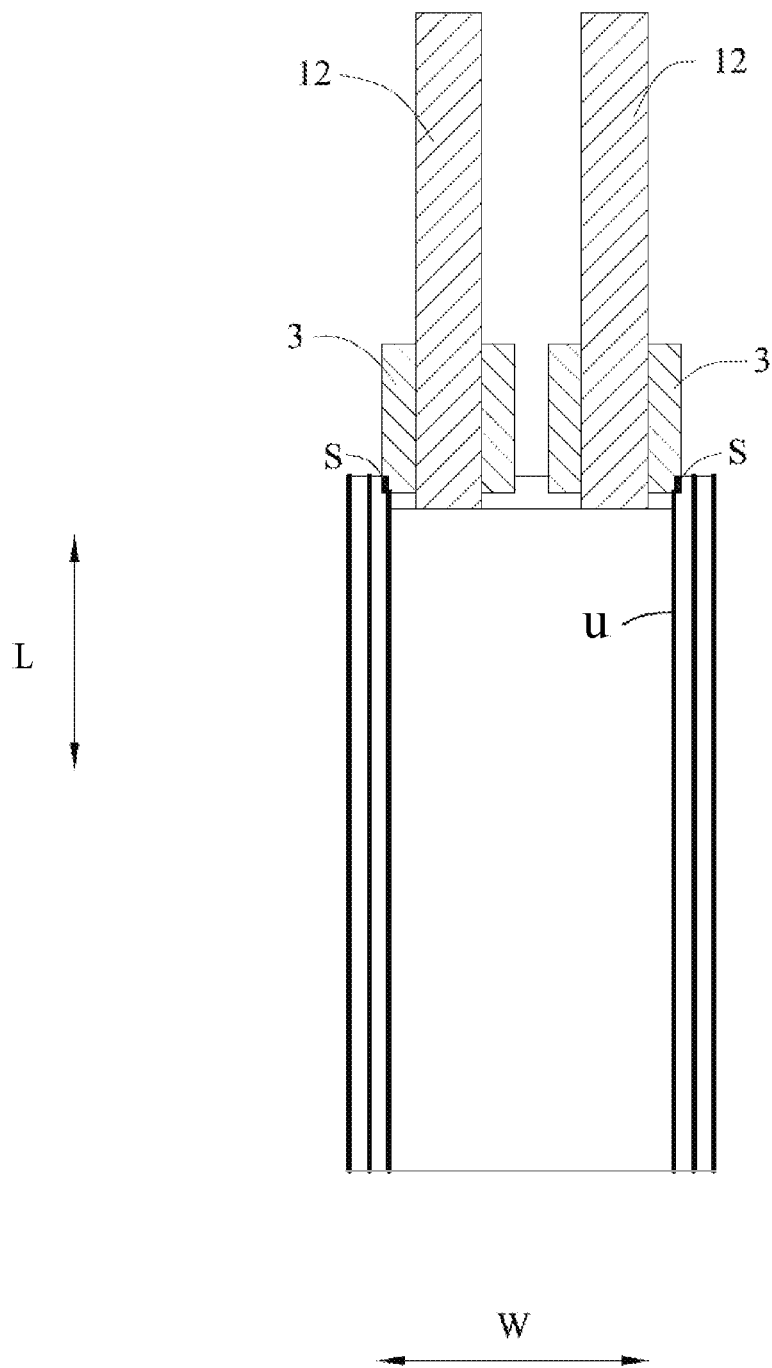
FIG. 1 is a sectional view of the secondary battery in the prior art.
Figure 2:
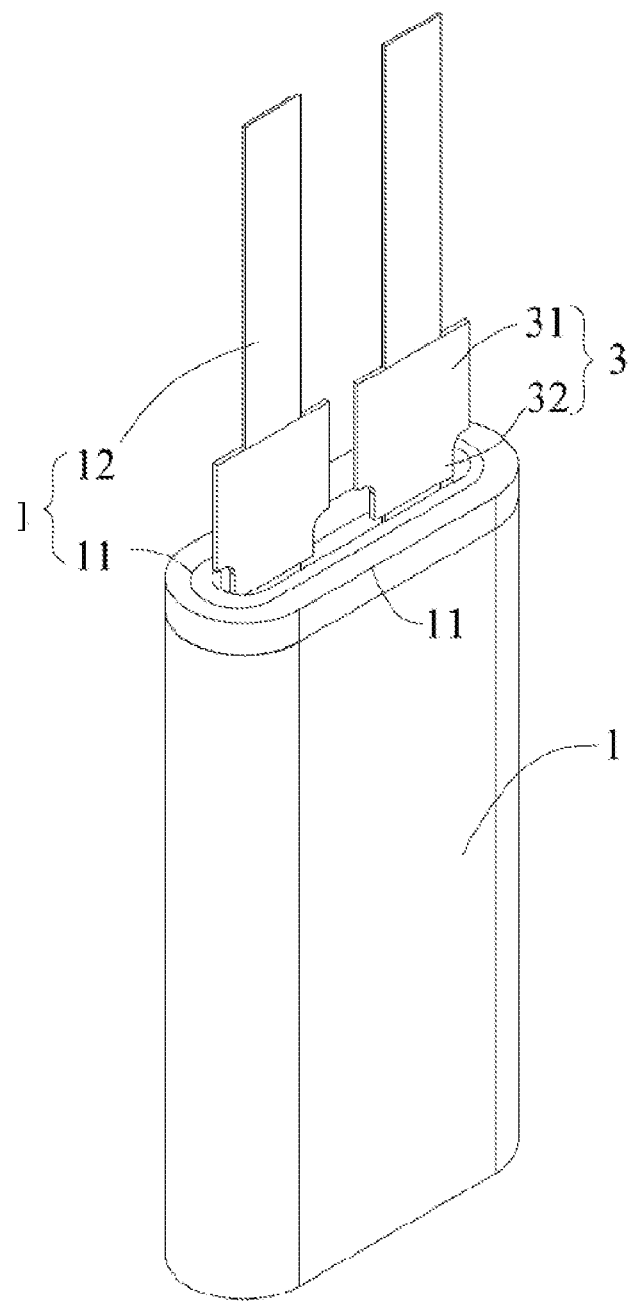
FIG. 2 is a stereoscopic view of the secondary battery according to the present invention, wherein the battery pouch is omitted.

The secondary battery of the present invention will be elaborated hereafter with reference to the drawings.

With reference to FIG. 2-5, the secondary battery according to the present invention comprises a winding bare electrode assembly 1, a battery pouch 2 and a sealing strip 3.

The winding bare electrode assembly 1 comprises a separator 11 and a tab 12.

The sealing strip 3 encloses a part of the tab 12 of the winding bare electrode assembly 1, is used for hermetically extending the tab 12 of the winding bare electrode assembly 1 out from the battery pouch 2 of the secondary battery, and is provided with a package portion 31 located in a package area P of the battery pouch 2 of the secondary battery, and an extension portion 32 disposed in the battery pouch 2.

Wherein a first width W1 of the package portion 31 in the width direction W is greater than a second width W2 of the tab 12, a third width W3 of the extension portion 32 in the width direction W is not less than the second width W2 of the tab 12, and is less than the first width W1 of the package portion 31, the outer side edge of the extension portion 32 in the width direction W is separated from the separator 11 in the width direction W, and the lower side edge of the package portion 31 in the length direction L is separated from the upper side edge of the separator 11 in the length direction L.

In the secondary battery according to the present invention, the first width W1 of the package portion 31 in the width direction W is greater than the second width W2 of the tab 12; the package portion 31 is located in the package area P of the battery pouch 2 of the secondary battery, such that the tab 12 of the winding bare electrode assembly 1 hermetically extends out from the battery pouch 2 of the secondary battery, after being packaged, the secondary battery can be avoided from leaking liquid from the position from which the tab 12 extends out of the battery pouch 2; the extension portion 32 encloses the part inside the battery pouch 2 of the tab 12 of the winding bare electrode assembly 1, thus preventing the battery from internal short circuit and erosion because the tab 12 is excessively bared; furthermore, the third width W3 of the extension portion 32 in the width direction W is not less than the second width W2 of the tab 12, and is less than the first width W1 of the package portion 31, the outer side edge of the extension portion 32 in the width direction W is ensured to separate from the separator 11 in the width direction W, in which way the separator 11 and the outer side edge of the extension portion 32 in the width direction W can be prevented from interfering with each other when the winding bare electrode assembly 1 is wound and formed, thus improving the winding efficiency and the winding quality; owing to the reduction of the third width W3 of the extension portion 32, the width of the secondary battery and the limit separation size of the tab 12 can be improved, thus increasing the diversity of product sizes; the lower side edge of the package portion 31 in the length direction L is separated from the upper side edge of the separator 11 in the length direction L, such that the interference between the separator 11 and the package portion 31 as well as the battery pouch 2 when the secondary battery is packaged can be avoided, thus improving the sealing effect of the tab 12 package.

Figure 4:
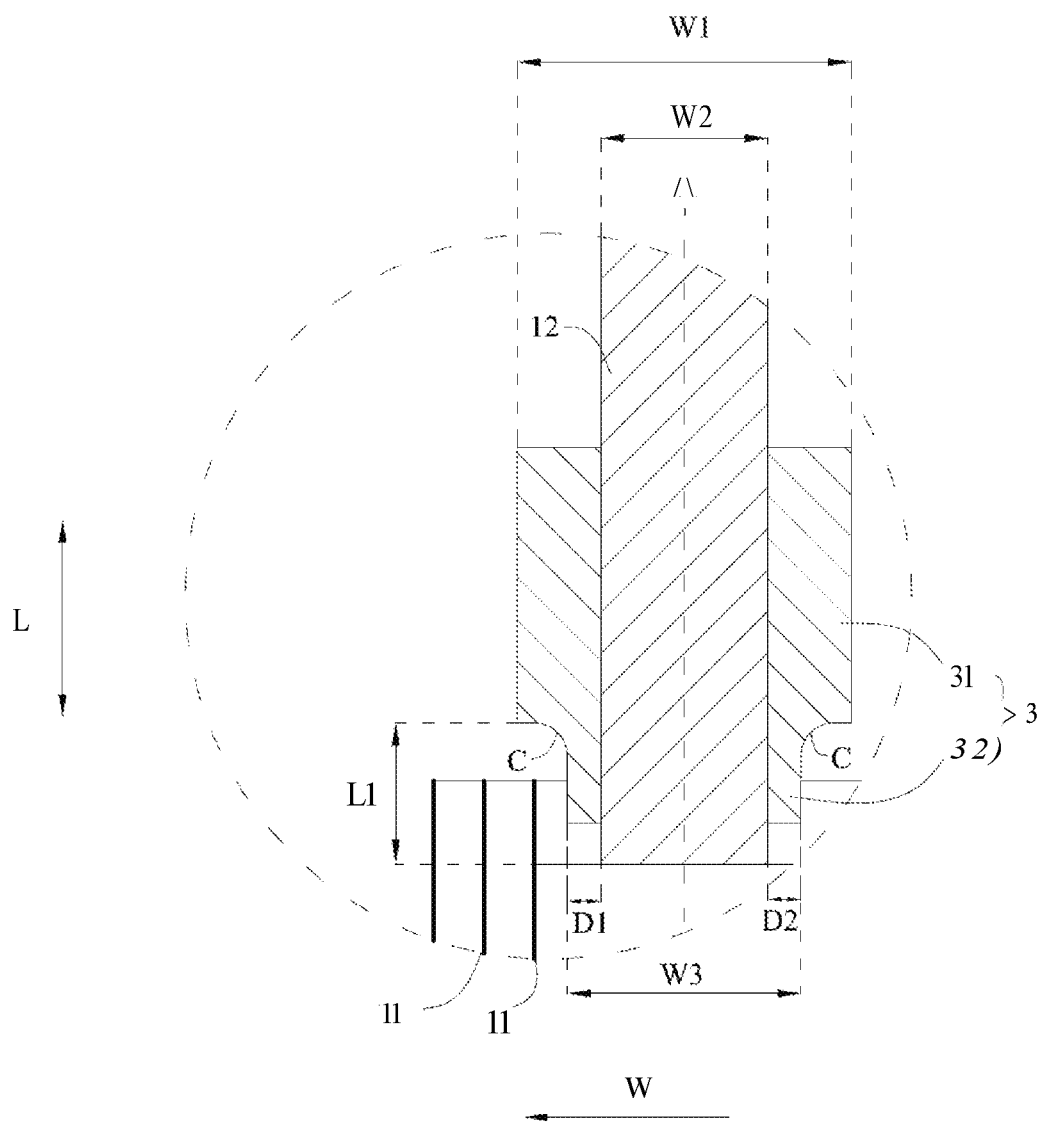
FIG. 4 is an enlarged view of the circle part in FIG. 3.
Figure 5:
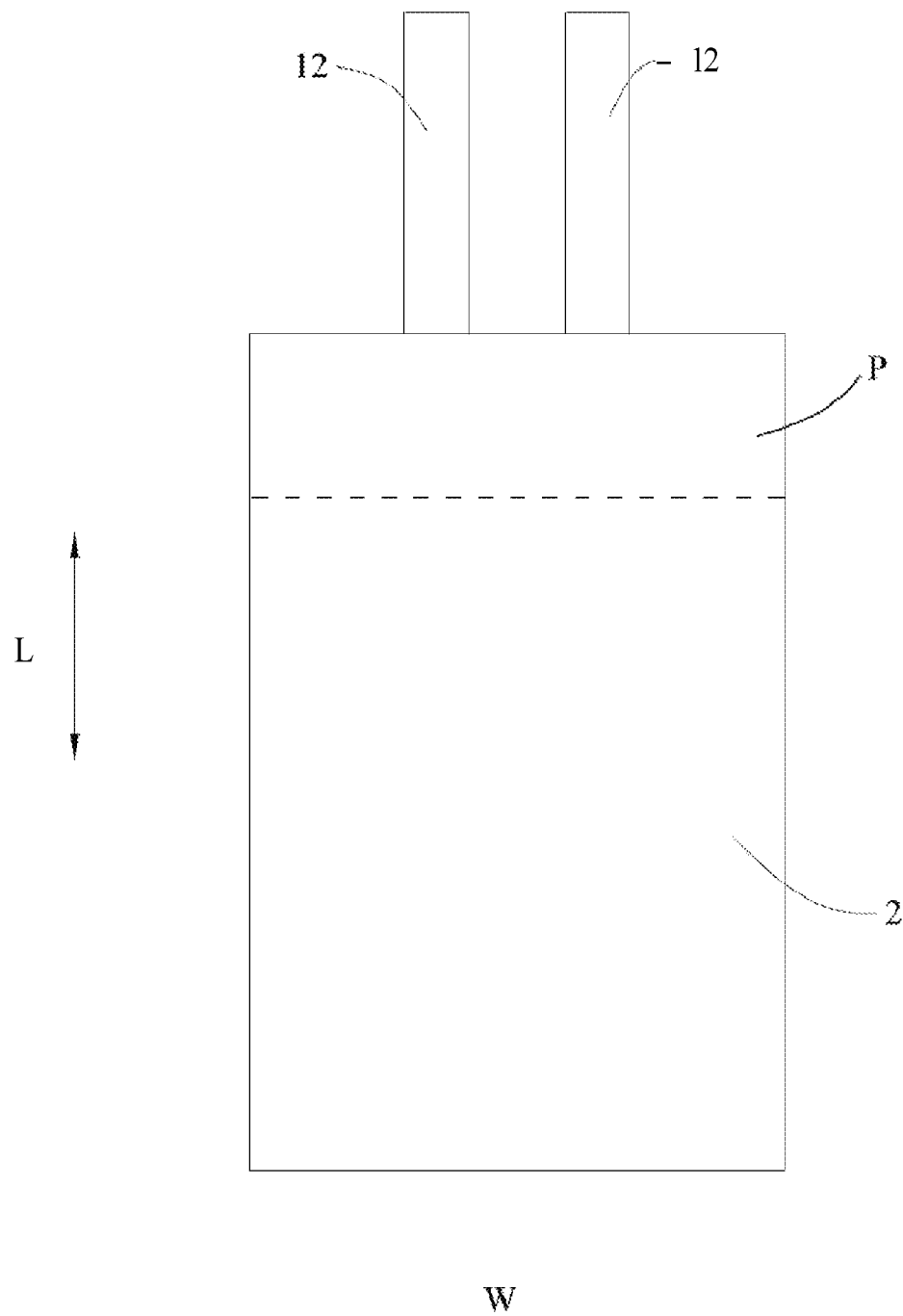
FIG. 5 is a schematic view of the secondary battery according to the present invention.

In the secondary battery according to the present invention, with reference to FIG. 4, in one embodiment, the outer side edge of the extension portion 32 in the width direction W and the outer side edge of the tab 12 in the width direction W are separated by a first distance D1 therebetween, 0 mm≤D1≤10 mm.

In the secondary battery according to the present invention, with reference to FIG. 4, in one embodiment, the inner side edge of the extension portion 32 in the width direction W and the inner side edge of the tab 12 in the width direction W are separated by a second distance D2 therebetween, 0 mm≤D2≤10 mm.

In the secondary battery according to the present invention, with reference to FIG. 4, in one embodiment, a first length of the extension portion 32 in the length direction L is L1, 0.2 mm≤L1≤10 mm.

In the secondary battery according to the present invention, with reference to FIG. 4, in one embodiment, a rounded corner C is configured between the outer side edge of the extension portion 32 in the width direction W and the lower side edge of the package portion 31 in the length direction L. In the process or after the sealing strip 3 is formed, a part of material is required to be cut off to form the extension portion 32, the rounded corner C can ensure that the sealing strip 3 does not scratch or tear the separator, and can also ensure that the cut-off part is easy to be removed in the process that the extension portion 32 of the sealing strip is formed.

In the secondary battery according to the present invention, in one embodiment, the radius of the rounded corner C is 0 mm-10 mm.

Figure 3:
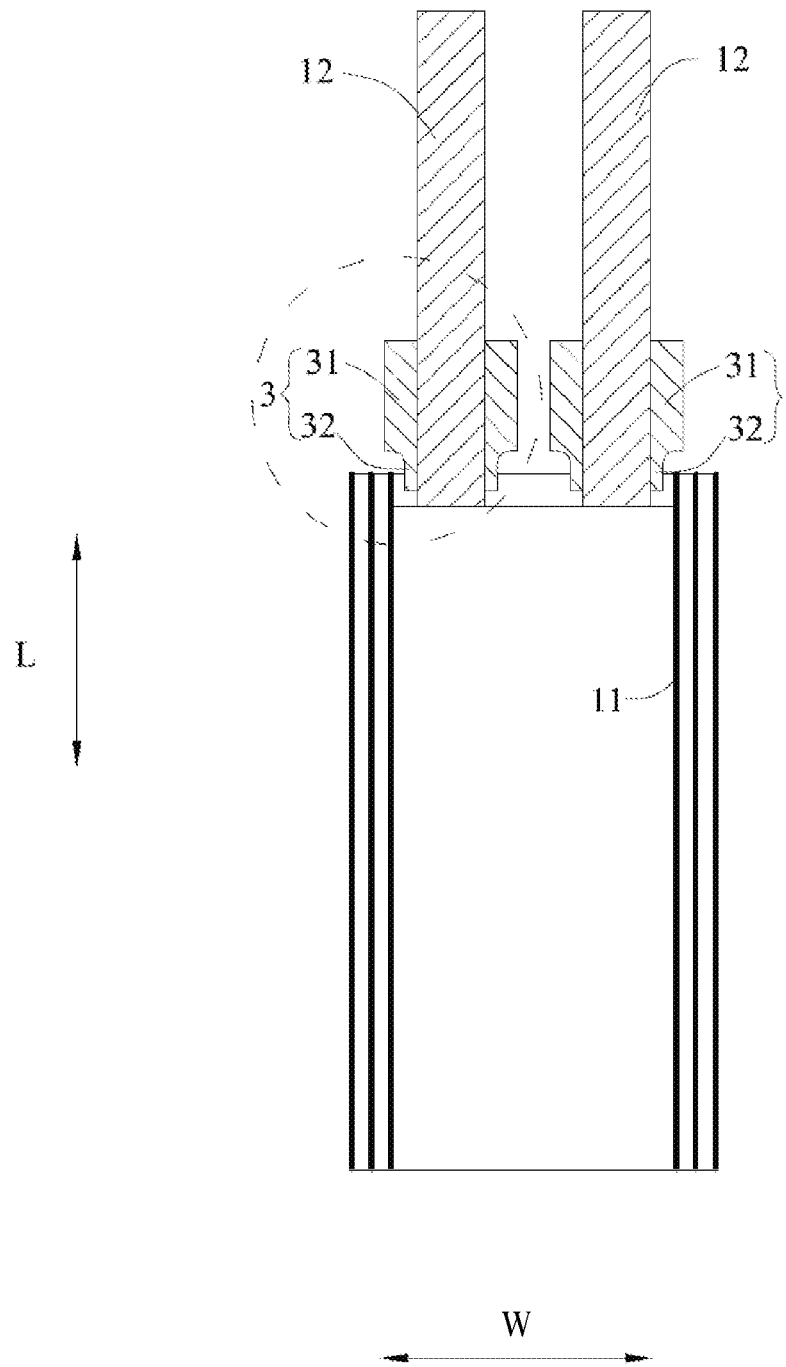
FIG. 3 is a sectional view of the secondary battery according to the present invention, wherein the battery pouch is omitted.

In the secondary battery according to the present invention, with reference to FIGS. 3 and 4, in one embodiment, the lower side edge of the extension portion 32 in the length direction L extends at least to a position from which the tab 12 protrudes out of an electrode plate of the winding bare electrode assembly 1. Extending the lower side edge of the extension portion 32 to the position from which the tab 12 protrudes out of the electrode plate of the winding bare electrode assembly 1, can seal the part of the tab 12 inside the battery pouch 2, thus avoiding the secondary battery from internal short circuit and preventing the tab 12 from being eroded.

In the secondary battery according to the present invention, with reference to FIG. 4, in one embodiment, the sealing strip 3 is left-right symmetric about the axis A of the tab 12 in parallel with the length direction L.

In the secondary battery according to the present invention, in one embodiment, the battery pouch 2 of the secondary battery is a soft battery pouch. The soft battery pouch is made from an aluminum plastic film.

In the secondary battery according to the present invention, in one embodiment, the secondary battery can be a lithium ion battery, a sodium ion battery or a zinc ion battery.

What is claimed is:

1. A secondary battery, comprising:
  an electrode assembly and a housing accommodating the electrode assembly;
  wherein the electrode assembly comprises a first electrode plate, a second electrode plate, and a separator disposed therebetween, the first electrode plate and the second electrode plate are wound to form the electrode assembly;
  the electrode assembly further comprises a tab disposed in the first electrode plate and protrudes from the housing; and, an adhesive layer disposed in the tab;
  wherein the adhesive layer comprises:
    a first portion sandwiched between a package area of the housing; and,
    a second portion, extending from the first portion along a length direction of the tab, and the second portion is disposed within the housing;
    in a width direction of the tab, the first portion has a width greater than that of the second portion;
    wherein in the length direction of the tab, the second portion protrudes into a space enclosed by an innermost layer of the separator.

2. The secondary battery of claim 1, wherein a periphery of the adhesive layer as vertically projected onto a plane perpendicular to the length direction of the tab is partially within a region defined by an innermost layer of the separator and an outermost layer of the separator.

3. The secondary battery of claim 2, wherein along the length direction of the tab, the second portion covers a part of the tab disposed between the first portion and the first electrode plate.

4. The secondary battery of claim 2, wherein a chamfer portion is formed at a junction of the first portion and the second portion.

5. The secondary battery of claim 2, wherein a round corner is formed at a junction of the first portion and the second portion.

6. The secondary battery of claim 5, wherein the round corner has a radius of 0.1 mm-10 mm.

7. The secondary battery of claim 2, wherein in the width direction of the tab, the second portion is spaced apart from the innermost layer of the separator.

8. The secondary battery of claim 1, wherein in the length direction of the tab, the separator is spaced apart from the housing.

9. The secondary battery of claim 1, wherein the first portion comprises a first part sandwiched between the package area of the housing, a second part protrudes from the housing, and a third part extending from the first part and connecting to the second portion.

10. The secondary battery of claim 1, wherein in the width direction, the separator comprises a first end close to the innermost layer of the separator, and a second end opposite to the first end, the first end is 0.1 to 10 mm beyond the tab.

11. The secondary battery of claim 10, wherein the second end is 0.1 to 10 mm beyond the tab.

12. The secondary battery of claim 1, wherein, in the length direction of the tab, a length of the second portion is L1, 0.2 mm≤L1<10 mm.

13. The secondary battery of claim 1, wherein, along the length direction of the tab, a lower side edge of the second portion is connected to the first electrode plate.

14. The secondary battery of claim 1, wherein in the length direction of the tab, the adhesive layer is symmetrical with respect to an axis of the tab.

15. The secondary battery of claim 1, wherein the housing is a pouch film.

16. The secondary battery of claim 1, wherein the secondary battery is a lithium ion battery, a sodium ion battery or a zinc ion battery.

* * * * *